Dec. 7, 1965    T. C. LEIGHTON    3,221,625
PANORAMIC CAMERA AND METHOD
Filed Aug. 3, 1962    3 Sheets-Sheet 2
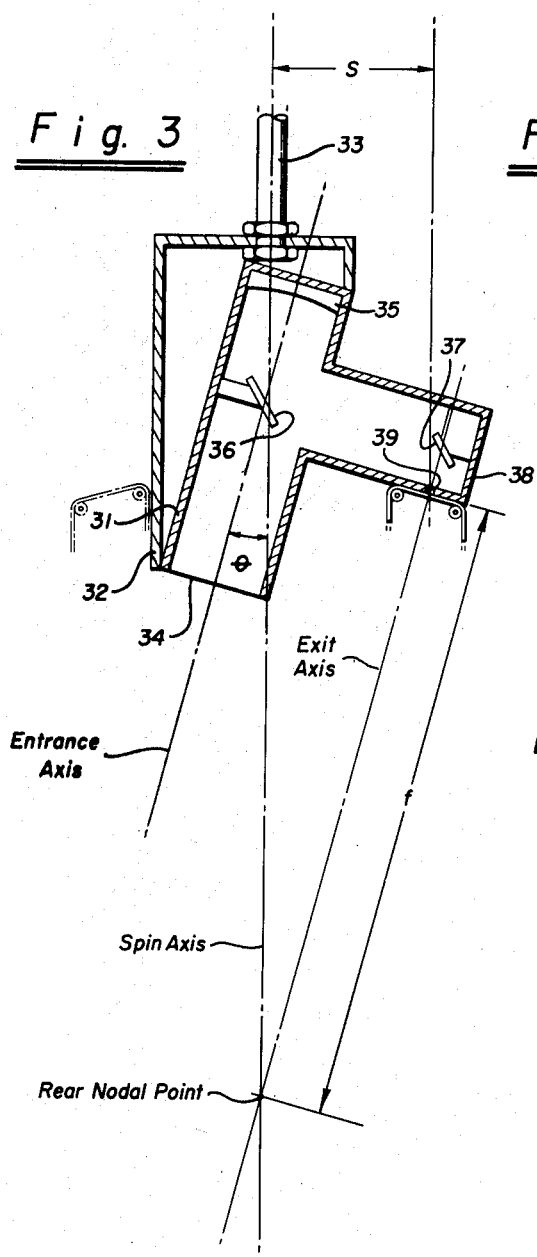
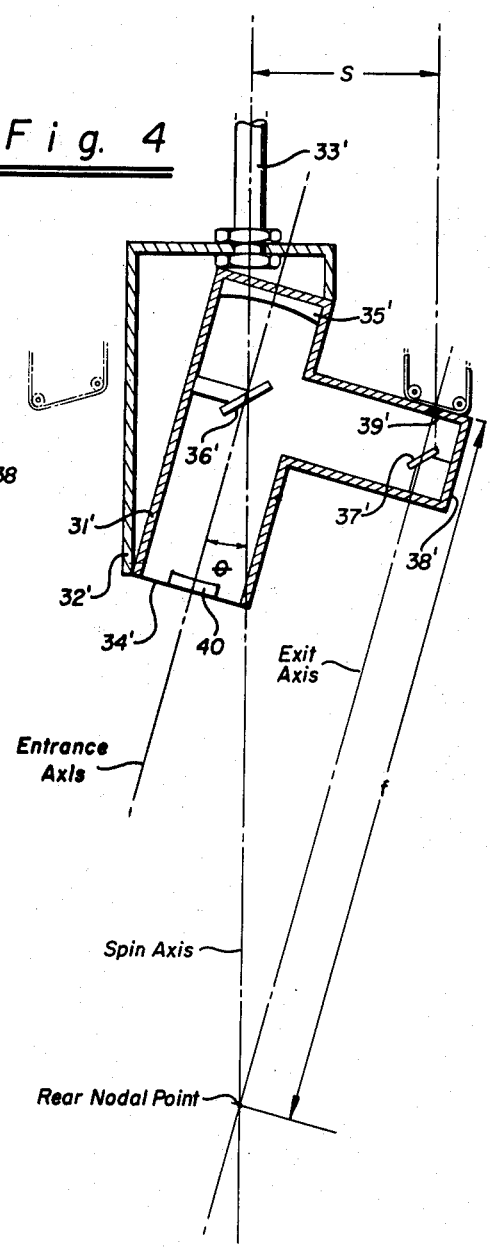
INVENTOR.
Thomas C. Leighton
BY
Bialos & Schlemmer
Attorneys

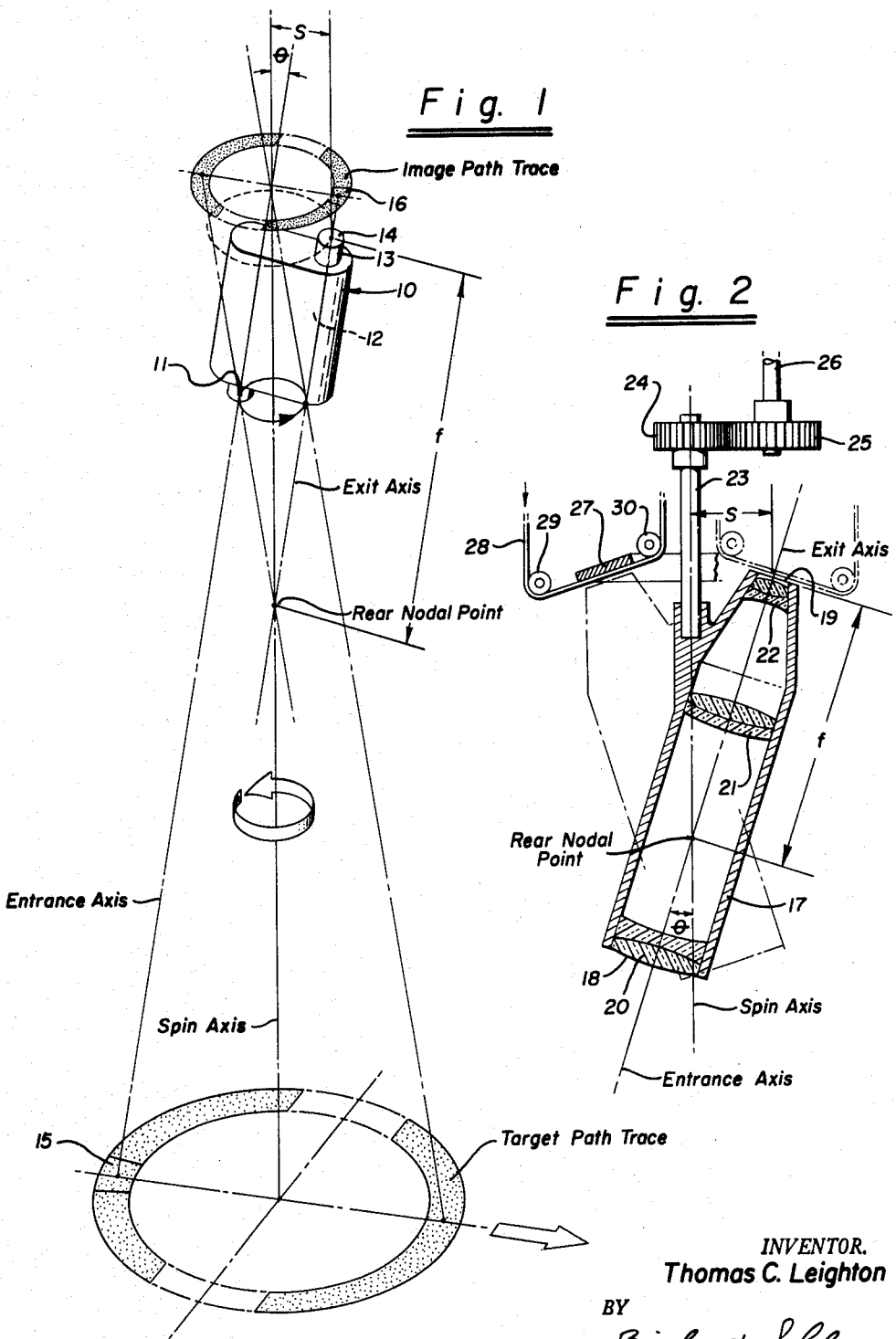

3,221,625
PANORAMIC CAMERA AND METHOD
Thomas C. Leighton, Palo Alto, Calif., assignor to Itek Corporation, Lexington, Mass., a corporation of Delaware
Filed Aug. 3, 1962, Ser. No. 214,541
27 Claims. (Cl. 95—12.5)

This invention relates to a panoramic camera and to a method of scanning a target area to produce images thereof suitable for recordation and subsequent reproduction.

In the field of photographic reconnaissance—aerial and underwater geographic mapping, for example—there is an increasing need to cover more and more areas in greater detail, and in order to graphically record the large areas involved and to resolve the desired ground detail, the cameras used must operate at extremely high resolution levels. The panoramic camera is best suited to provide both high resolution levels and wide angular coverage, which basically are counteracting requirements, because such a camera with its transverse viewing sweep affords coverage of a wide target area while maintaining relatively narrow fields angles which are preferred for high resolution photography because lenses providing wide angular coverage have various aberrations of considerable and undesirable significance.

An important consideration in discerning small ground detail is the focal length of the optical system employed because, for a given altitude, ground resolution can be increased by the use of longer focal-length optics. However, as the focal length of the optical system becomes longer, the necessary lens compositions become quite large and heavy and, as a consequence, are hard to support, are structurally unstable, and represent considerable inertia—all of which make it difficult to reciprocate or swing the camera or optical system thereof from side to side, relative to the forward motion of the vehicle carrying the same, to provide wide-angle coverage or coverage of large target areas. Thus, a panoramic camera in its primary form, in which the camera is moved to sweep a target area and the recording film is moved in synchronism therewith, is ill suited to the use of optical systems having long focal lengths.

In an effort to compensate for the difficulties encountered in conventional panoramic cameras where the focal length of the optical system is quite long, modified arrangements have been proposed in which the panoramic camera has not been moved or reciprocated in its entirety, but instead is equipped with either reciprocable lens components or movable mirror arrangements that provide the sweep function; and in other instances the camera has been orbitally rotated rather than reciprocated so that no periodic change in inertia occurs during the sweep movement. However, in the first instance, relative motion is present among the various components of the optical system; in the second instance, only a relatively small portion of the entire rotary sweep movement of the camera has been used in photographing a target area; and in all instances, it is difficult to properly synchronize the movement of the camera or components thereof to avoid smearing of the image recordation, and the camera and support systems therefor still remain quite heavy and cumbersome and necessitate large, complex, and relatively powerful motivating components.

The camera structure disclosed in Sonne patent, No. 3,016,001, is an example of a camera that is rotated through 360° about an axis; and in this structure the image-forming system or light-gathering means is laterally offset from the axis of rotation which is essentially a vertical line passing through the center of the structure. A circular exposure is generated on a single film to record the images of the target area swept by the image-forming system.

In view of the foregoing, an object of the present invention is in the provision of an improved panoramic camera for and an improved method of sweeping or scanning a target area to produce images thereof suitable for recordation and subsequent reproduction—such camera and method providing both wide angular coverage and high resolution levels so that large target areas can be graphically recorded with considerable information detail.

Another object of the invention is that of providing an improved panoramic camera having a long focal length and consequent high resolution levels, yet being a compact structure and also obviating the inertial problems present in certain of the prior panoramic camera systems.

Still another object is in the provision of a panoramic camera structure adapted to be continuously rotated about a spin axis that extends through the image-forming system or light-gathering means (in contrast, for example, to the aforementioned Sonne camera in which the image-forming system is laterally offset from the axis of rotation) whereby a significant reduction in the lateral dimensions of the camera structure is realized, and which provides stereographic coverage of the target area by recording images thereof on two separate films or recordation media.

Still another object is to provide an improved panoramic camera in which relative motion of the optical components thereof is obviated as are changes in momentum of the scanning system as the target area is swept, and which is relatively simple, has simplified mounting or support requirements, and reduces the complexity and power demands of the motivating mechanism therefor.

Yet another object is that of providing a panoramic camera of the character described which maximizes the target information that is recorded per unit of time in that for a given aperture or slit width more traversals are made of the lateral width of the target swath than in prior cameras, with the result that more complete lengthwise or longitudinal coverage of a target is obtained at high flight velocities (i.e., high ratios of flight velocity to altitude—$V/H$) such that prior known cameras would necessarily leave information gaps along the flight path; in which stereo coverage of the target area is obtained by recording the same target information, at different points of time, during forward and aft traversals of the target on separate and symmetrically disposed recordation means; and in which panoramic distortion is minimized through particular platen transformations.

A further object is in the provision of a camera and method of the character described in which an image-forming optical system is rotated in a manner such that the entrance axis thereof describes a generally conical configuration as a target area is scanned, and the path traced by the entrance aperture of the optical system is an annulus as is the image path traced by the exit aperture of the system—the spin axis or axis of rotation of the image-forming system, the entrance axis thereof, and the exit axis of such system having predetermined orientations and dispositions relative to each other so that the angular motion of the image-forming system is compensated by the rotary motion of the image path trace and, as a result, image details are substantially independent of the scan motion.

Additional objects and advantages of the invention will become apparent as the specification develops.

Exemplary embodiments of the invention are illustrated in the accompanying drawings, in which—

FIGURE 1 is a pictorial or diagrammatic view showing the particular interrelation of the spin axis, entrance axis and exit axis of the image-forming system;

FIG. 2 is a somewhat diagrammatic longitudinal sectional view illustrating a refractive image-forming system embodying the invention;

FIGURE 3 is a somewhat diagrammatic longitudinal sectional view illustrating one form of reflective image-forming system embodying the invention;

FIGURE 4 is a somewhat diagrammatic longitudinal sectional view illustrating another form of reflective image-forming system embodying the invention.

Figure 5:
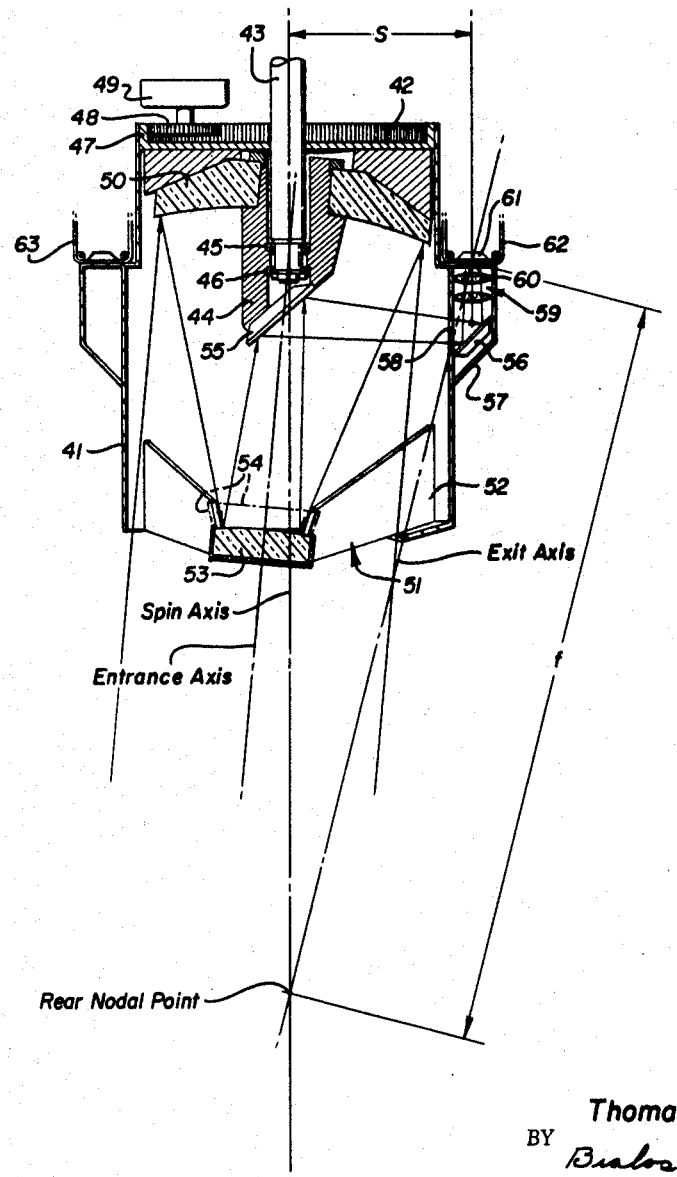
FIGURE 5 is a side view in elevation of an advantageous functional embodiment of the invention.

In FIGURE 1 an exemplary image-forming system is shown diagrammatically, and is indicated in its entirety with the numeral 10. Such image-forming system includes a primary image-forming means or section generally indicated at 11, an image-offset means or section generally indicated by the numeral 12, and an image rectification means or section 13. The image-forming system 10 is supported for rotation about an axis designated as the "spin axis," and the direction of rotation is indicated by the arcuate arrow associated therewith.

The image-forming system has an entrance aperture and an entrance or sweep axis, so designated in FIGURE 1, extending through the entrance aperture at substantially the center thereof. The entrance axis describes a cone-shaped configuration as the image-forming system rotates about the spin axis thereof, as indicated in FIGURE 1, and this result will be discussed in greater detail hereinafter. The image-forming system has a location of good imagery 14 at which image recordation may be effected, and such location is essentially at the exit aperture of the image-forming system which is coincident with and the same as the exit aperture of the rectification means 13.

Such exit aperture describes an annulus (identified as the "image path trace") as the image-forming system rotates about its spin axis. Similarly, the target area scanned by the entrance aperture of the image-forming system, which is coincident with and the same as the entrance aperture of the primary image-forming means 11, during rotaion of the system 10 is an annulus identified in the drawing as the "target path trace." Thus, as the image-forming system 10 is advanced or travels in the direction of the arrow associated with the target path trace (the image-forming system being carried by a vehicle such as an aircraft), the trace describes a plurality of overlapping annuli, the centers of which lie along the axis of displacement or travel, and the center of each such annulus lies substantially on a projection of the spin axis at the time any such annulus is being traced.

The image-forming system 10, which may or may not include image-offset means 12 and/or image rectification means 13, has an "exit axis" identified as such in FIGURE 1. The exit axis extends through the exit aperture and through the location of good imagery 14 usually at its center. The exit axis may or may not be generally normal to the plane of the location of good imagery depending upon the characteristics of the film platen employed for photographic recordation of the images thereat. For example, if such platen is conical in the particular arrangement being considered, the axis might be normal thereto; but if flat, the axis will not be precisely normal to the plane thereof. It should be noted that where image-offset means are included in the image-forming system (as in FIGURE 1), the exit axis is non-coincident with the entrance axis.

The image-forming system is oriented and supported so that the exit axis thereof substantially intersects the spin axis at the rear or virtual nodal point of the image-forming system, and so that the entrance axis forms an angle $\theta$ with the spin axis—usually by intersection therewith although these axes could be offset with respect to each other and not actually intersect in the ordinary sense of the term. The focal length $f$ of the image-forming system is defined by the angular image detail scale factor of the image-forming system in its entirety which, as heretofore stated, may or may not include image-offset means and/or image rectification means. More particularly, the focal length being considered herein is that focal length which is measured in the tangential direction across the exit aperture (not the radial focal length), and may be stated to be defined by the relationship between the linear distance separating two image points in the image surface as compared to the angular distance between the same two image points in object space. In physical terms, as shown in the drawings, the focal length $f$ is the straight-line distance along the exit axis between the rear nodal point and the image surface or location of good imagery 14. The center of the location of good imagery 14 is offset from the spin axis by a perpendicular distance $S$, and the geometric relationships are such that $S = f \sin \theta$.

The direction of offset of the location of good imagery 14 from the spin axis is such that the sweep motion of the location 14 is opposite to and tends to compensate for the image motion resulting from the rotation of the entrance axis. In a geometric sense, the center of the location 14 lies generally in a plane defined by the spin axis and entrance axis, and is offset from the spin axis in a direction opposite to that of the entrance axis at its point of emergence from the entrance aperture.

The image path trace is essentially coincident with the plane defined by the rotational movement of the location of good imagery 14, and image recordation means (not shown in FIGURE 1) is intended to be disposed along such plane. Customarily, the image recordation means is photographic film oriented so as to be traversed by the location 14 and exposed thereby to the imagery appearing at such location. However, the image recordation means may have other forms, as is well known, and may utilize certain of the presently available electrostatic, magnetic or electronic recording techniques. For example, an electronic image intensifier in conjunction with a plastic—i.e., electrostatic—recording media can be used. Further, recordation could be accomplished in certain instances following direct transmission of the image information to a remote location where it would also be available for immediate inspection or other use.

In the system shown in FIGURE 1, image recordation is effected only during the fore and aft portions of the annular sweep of the image-forming system, and the recording portions of such motion are indicated on the target path trace and image path trace by the shaded areas. At the particular instant illustrated in FIGURE 1, the target area being viewed by the image-forming system is the generally wedge-shaped segment 15, and the corresponding generally wedge-shaped segment on the image path trace presented for recordation is denoted with the numeral 16. Thus, for each complete rotation of the image-forming system 10, a target section is scanned having the general shape of an annulus; and images respectively corresponding to the fore and aft segments of such annulus are recorded.

It will be apparent that as the image-forming system is bodily displaced by the moving vehicle carrying the same in the direction of travel thereof, a plurality of annuli is scanned by the rotating image-forming system. The rotational velocity of the system is synchronized with and related to the rate of travel or displacement of the system so that the fore and aft sections of each annulus respectively touch or partially overlap the corresponding fore and aft sections of the prior scanned annulus. Quite apparently, image motion compensation (IMC) must be provided to compensate for the relative movement between the target and the image-forming system which is being continuously displaced relative thereto. Compensation of this type (not shown in FIGURE 1) can be provided in a conventional manner which, in the preferred form, involves enforcing a forward motion on the recording media suitably synchronized with the forward motion of the image-forming system relative to the target area scanned thereby.

In use of the apparatus, the image-forming system 10 is suitably mounted in an appropriate vehicle and is continuously rotated about the spin axis. Each complete rotation thereof causes the entrance aperture to scan a target section of annular configuration such that the target path trace is an annulus. The image path trace provided by the location of good imagery 14 has a corresponding configuration (namely, that of an annulus). The orientation and interrelation of the various axes are such that the exit axis of the image-forming system, which extends through the location of good imagery, substantially intersects the spin axis at the rear or virtual nodal point of the image-forming system. The entrance axis forms an angle $\theta$ with the spin axis, and the center of the image location 14 is offset from the spin axis in the appropriate direction by a distance S such that the relationship $S = f \sin \theta$ is provided. When this relationship obtains, the rotary motion of the image location 14 compensates for the angular motion of the image-forming system, and the position of each image detail is, therefore, independent of the scan motion. Thus, the rotating image-forming system lays down a stationary annular image of the conically swept field of view.

It is preferable to support the image-forming system 10 so that the spin axis extends through the center of gravity thereof, or of the rotating mass in the event that it comprises more than the image-forming system since by such arrangement the rotating mass is statically balanced and is readily balanced dynamically. Quite apparently, such balance can be attained should the spin axis be offset from the natural center of gravity of the rotating system by appropriately weighting the same.

Any suitable motivating apparatus may be used to rotate the image-forming system, and exemplary arrangements will be described hereinafter. However, it may be noted at this point that a variety of driving mechanisms can be used as, for example, motor driven gear trains, magnetic drives in which the rotating system comprises the rotor of an electric motor, and the rotating system might be connected directly to a motor shaft.

As indicated hereinbefore, the image-forming system includes a primary image-forming means and may include either or both image-offset means and image rectification means. The primary image-forming means comprises an optical system which may be defined by any one of a number of lens compositions and may be either a reflective or a refractive system. FIGURES 2 through 4 illustrate somewhat diagrammatically various lens systems that may be used. The image-forming system shown in FIGURE 2 is a refractive system, and includes a primary image-forming means and may include image rectification means.

Considering the structure shown in FIGURE 2 in greater detail, it includes a lens casing 17 having an entrance aperture 18 at one end and an exit aperture 19 at the opposite end thereof. Mounted within the casing 17 is a lens system including front and rear lens compositions 20 and 21 and a modification or exit lens composition 22 located adjacent the exit aperture 19. The casing 17 is essentially a straight-line tube and consequently the entrance axis which passes through the entrance aperture 18 and the exit axis which passes through the exit aperture 19 are substantially coincident.

The casing 17 is supported for rotation about a spin axis, and the support is such that the entrance axis intersects the spin axis so as to define an angle $\theta$ therewith. Similarly, the exit axis intersects the spin axis at the rear nodal point of the image-forming system which coincides with the intersection of the spin axis with both the entrance and exit axes since such axes are coincident. In the form shown, the casing 17 is rigidly secured to a rotatable shaft 23 equipped with a gear 24 drivingly engaged by a gear 25 carried by a drive shaft 26 adapted to be rotated by any suitable means, such as an electric motor. As the shaft 23 rotates, the entrance axis of the image-forming system describes a cone, and the entrance aperture 18 describes an annulus on the target area. Similarly, the exit aperture 19 which defines a location of good imagery describes an annulus as the casing 17 and shaft 23 are rotated, and such annulus is substantially coincident with a film platen 27 of generally conical configuration.

A photographic film 28 suitably entrained about rollers 29 and 30 passes under the platen 27 in facing relation with the annulus described by the exit aperture 19 or location of good imagery thereat so as to be traversed thereby. Quite apparently, supply and take-up reels will be provided for the film 28; and as indicated in the description of FIGURE 1, recordation media is provided at two locations along the platen 27 spaced from each other by substantially 180°, but only one such recordation media (the film 28) is shown in FIGURE 2 for purposes of simplifying the drawings.

The center of the location of good imagery is perpendicularly spaced from the spin axis by a distance S, and the distance along the exit axis between the rear nodal point and the surface defined by such location of good imagery is substantially equal to the focal length $f$, all as described hereinbefore. However, it may be noted that since the surface generated by the rotational movement of the location of good imagery is a cone (or, more explicitly, a frustum of a cone), image rectification means are not necessarily employed in the image-forming system; and in such event, the tangential or radial focal lengths are the same, as is the case in most simple lens systems. It may be noted that a telephoto lens system could be used as the image-forming system illustrated in FIGURE 2; and in such instance, the optics of the telephoto system would be refractive because the image-forming system of FIGURE 2 is a refractive arrangement. It should be understood, however, that a reflective telephoto system could also be used in an appropriate reflective arrangement such as those which will now be described.

A reflective optical system of the Newtonian type is illustrated in FIGURE 3, and it comprises a lens casing 31 angularly disposed within a housing 32 secured to a shaft 33 so as to be rotatably driven thereby. The longitudinal axis of the shaft 33 defines a spin axis for the rotating system. One end of the casing 31 has an opening therein defining an entrance aperture 34, and an entrance axis extends therethrough. Adjacent its opposite end, the casing is equipped with a reflective lens or primary error 35. A diagonal plane mirror 36 is supported by the casing 31 intermediate the ends thereof, and it comprises one component of an image-offset means, which has as another component thereof a second plane mirror 37 diagonally oriented and secured to an outwardly extending section 38 of the casing.

The offset section 38 provides a slit or exit aperture 39 defining a location of good imagery thereat, and the exit axis of the image-forming system extends through such location and intersects the spin axis at the rear nodal point of the system. The entrance axis intersects the spin axis to form an angle $\theta$ therewith, and the spin axis is offset from the center of the location of good imagery by the perpendicular distance S. The orientation and disposition of the structure is such that the relationship $S = f \sin \theta$ exists, where the distance along the exit axis between the rear nodal point and the surface defined by the location of good imagery is equal to the focal length $f$, as previously set forth.

Symmetrically disposed recordation apparatus is necessarily provided as heretofore described, and as illustrated in FIGURE 3. The slit 39 can perform the function of a shutter for a photographic film used as the recordation media with such apparatus; and the tangential dimension or width of such slit will be limited by the allowable image smear, and the radial dimension or length of such slit will be limited by the amount and character of the image motion compensation that is provided.

FIGURE 4, also in somewhat diagrammatic form, illustrates a reflective optical system of the Cassegrainian type, and it differs from the reflective system shown in FIGURE 3 only in that a secondary mirror is employed to fold the light reflected from the primary mirror and return it to the image-offset means. Therefore, the primed form of the same numerals is used to identify the respectively corresponding parts, and the secondary mirror which is supported by the casing 32' is denoted with the numeral 40.

The apparatus shown in FIGURE 4 functions in all essential respects as the apparatus illustrated in FIGURE 3, and all of the relationships concerning the various axes pertain, as heretofore described. The Cassegrainian optical system, however, has the additional advantage of providing a relatively long focal length in a compact package.

In view of such advantage, a desirable functional embodiment of the invention utilizing a Cassegrainian optical system is shown in FIGURE 5. This structure comprises an outer, somewhat cylindrical casing 41 closed at its upper end by a top wall 42 having centrally located therein an opening passing a support shaft 43 therethrough that is rigidly related to a vehicle in which the camera is mounted. The casing 41 is secured interiorly thereof to the shaft 43 by suitable support structure 4 which includes spaced bearings 45 and 46 rotatably connecting the support structure to the shaft. The support structure 44 is fixedly secured to the top wall 42 of the casing; and therefore, the casing in its entirety is supported by and is rotatable relative to the shaft 43.

A ring gear 47 is provided by the casing 41 along the outer surface of the top wall thereof in spaced circumjacent relation with the shaft 43, and it is engaged by a drive gear 48 connected to the shaft of a motor 49. Energization of the motor 49 rotates the casing 41 about the longitudinal axis of the shaft 43, and such axis, then, defines the spin axis of the system. Mounted within the casing subjacent the top wall 42 thereof is a primary mirror 50 of concave configuration that is angularly disposed with respect to the spin axis (the shaft 43 extending through the mirror), and the mirror receives light through an enlarged opening 51 at the bottom of the casing and such opening defines an entrance aperture. Carried by suitable support straps 52 secured to the casing interiorly thereof is a secondary mirror 53 of somewhat convex configuration disposed in facing relation with the primary mirror 50 so as to receive light reflected therefrom. The mirror 53 is located within the entrance aperture 51 and is provided with a light shield 54 (shown in phantom for drawing simplification) extending toward the primary mirror 50, which defines with the mirror 53 primary image-forming means and the entrance axis of the entire image-forming system.

Secured to the mounting structure 44 intermediate the primary and secondary mirrors is an angularly disposed, first plane mirror 55 adapted to receive light reflected thereto by the secondary mirror 53. The plane mirror 55 together with a second plane mirror 56, mounted within a laterally disposed casing projection 57 that may be an annulus circumjacent the main body of the casing, define an image-offset means. The second plane mirror 56 receives light reflected thereto by the plane mirror 55 through an opening 58 in the casing, and reflects such light to a rectification means (generally indicated at 59) that is also located within the casing extension 57.

The rectification means may include one or more lenses, as shown; and the number of lenses, the type thereof and other optical properties that the lens or lenses may have depends upon the particular result intended to be effected by the rectification means—that is to say, the type of "corrective distortion" to be imposed thereby on the light images passing therethrough. Light passing through the rectification means 59 is directed thereby through an opening 60 in the top wall of the casing extension 57, and such opening defines the exit aperture of the image-forming system as well as the shutter for the recordation means.

The location of good imagery of the image-forming system is over and substantially coincident with the plane of such exit aperture, with its center substantially on the exit axis (as shown in FIGURE 5). Also the exit axis intersects the spin axis substantially at the rear nodal point of the system. The entrance axis intersects the spin axis to form an angle $\theta$ therewith, the center of the location of good imagery is spaced from the spin axis by a perpendicular distance S, and the distance along the exit axis between the rear nodal point and the plane defined by the location of good imagery is substantially equal to the focal length $f$, so that the relationship $S = f \sin \theta$ exists, all as described hereinbefore.

The image recordation means in the arrangement shown is a photographic film system that in all of its essential respects may be substantially conventional, and for that reason many of the structural details which pertain thereto have been omitted since they are not germane to the present invention. Such recordation means includes two separate recordation locations which are spaced from each other by substantially 180°, and a film platen 61 is disposed at each such location. The platen 61 is essentially flat, and may be a continuous ring circumjacent the casing 41 and oriented in juxtaposition with the top wall of the casing projection 57. Since the platen 61 in the particular illustration is flat, the exit axis is not normal to the plane thereof and to the plane of the location of good imagery, and the image rectification means 59 will impose a corrective distortion on the light images transmitted to the film platen so as to provide for a useful and acceptable flat recordation of a generally conical image that results from the sweep characteristics of the system—that is, the generally cone-shaped annulus (i.e., the annulus is a frustrum of a cone) describing the target trace made by the entrance aperture 51.

A photographic film 62 entrained about suitable rollers, drive and take-up reels, etc. passes beneath the platen 61 at one recordation location; and a separate photographic film 63 suitably entrained about appropriate rollers, drive and take-up reels, etc. passes under the platen at the other recordation location. As the casing 41 is rotated by the motor 49, the exit aperture 60 sequentially and successively traverses the film 62 and film 63 and in so doing exposes the same to the images provided at the times of traversal by the image-forming system. As a consequence, such images are recorded on the films.

As stated hereinbefore and as indicated most clearly in FIGURE 1, stereo coverage of the target area is obtained by recording the same target information at different points of time during the forward and aft traversals of the target. Thus, as the casing 41 rotates, the entrance aperture 51 sweeps or traverses one target area and the image thereof is recorded, for example, on the film strip 62 which may be considered a recordation of the aft traversal. As the casing continues to rotate and makes a forward traversal of the target area, the image thereof is recorded on the film 63. Since the casing rotates continuously, the successive fore and aft traversals record overlapping target areas, and the rotational velocity of the casing 41 is related to the movement of the vehicle carrying the same to provide for such overlapping recordations. The films 62 and 63 are advanced in timed relation with the rotation of the casing so that unexposed film is properly oriented for each traversal thereof by the exit aperture 60.

Since the casing continuously rotates in the same angular direction, there are no cyclic changes in inertia that must be accommodated by the support and drive structures; and more useful traversals are made of the target area because recordations are made thereof twice during each complete rotation of the casing. The arrangement also provides a long focal length in a compact package, and wide angular coverage of a target area is attained while providing high resolution levels that afford considerable information detail.

In all embodiments of the invention, the camera system is continuously rotated about a fixed spin axis; and such fixed spin axis passes through or intersects the light gathering means which forms a light path between the entrance aperture and the exit aperture of the image-forming system, thus providing a compact arrangement. Also, the exit aperture is continuously rotated orbitally along a path about the spin axis. Hence, separate image recording means positioned at angularly spaced points or locations along such orbital path provide a simple and efficient arrangement enabling stereographic recordation.

While in the foregoing specification embodiments of the invention have been set forth in considerable detail for purposes of making an adequate disclosure thereof, it will be appreciated that changes may be made in such details by those skilled in the art without departing from the spirit and principles of the invention.

I claim:

1. A panoramic camera, comprising an image-forming system having an entrance aperture and an exit aperture and a location at which good imagery is provided for image recordation thereat, said image-forming system having an exit axis extending through said exit aperture and such location of good imagery and having also an entrance axis of predetermined direction extending through said entrance aperture, support structure providing a mounting for said image-forming system for rotational movement thereof about a predetermined spin axis, and drive means for rotating said image-forming system in one angular direction, said exit axis and said spin axis being angularly disposed with respect to each other and oriented so as to substantially intersect at a position approximating the rear nodal point of said image-forming system and said entrance axis and spin axis also being angularly disposed with respect to each other and oriented so as to substantially intersect, the interrelationship of said spin and entrance and exit axes being such that rotation of said image-forming system orbits both said entrance and exit apertures so that the first thereof describes a scanning annulus the mean diameter of which is defined by the trace of said entrance axis and the second of which describes an image-path annulus the mean diameter of which is defined by the trace of said exit axis.

2. The panoramic camera of claim 1 in which said spin axis extends substantially through the center of gravity of said image-forming system.

3. The panoramic camera of claim 1 in which said image-forming system includes image-correction means for rectification of any image appearing at such location of good imagery.

4. The panoramic camera of claim 1 and further comprising recording means adjacent one position traversed by such location of good imagery during rotation of said image-forming system so as to be traversed by such location of good imagery upon rotational movement of said image-forming system.

5. The panoramic camera of claim 4 and further comprising a film platen adjacent the aforesaid one position traversed by such location of good imagery during rotation of said image-forming system, and structure for supporting and advancing film along said platen in facing relation with such location of good imagery so as to be traversed thereby upon rotational movement of said image-forming system.

6. The panoramic camera of claim 1 in which said image-forming system includes primary image-forming means and image-offset means and said primary image-forming means is a refractive lens system.

7. The panoramic camera of claim 1 in which said image-forming system includes primary image-forming means and image-offset means and said primary image-forming means is a reflective lens system.

8. A panoramic camera, comprising an image-forming system having a location at which good imagery is provided for image recordation thereat and including primary image-forming means and image-offset means, said primary image-forming means having an entrance axis of predetermined direction, and support structure providing a mounting for said image-forming system for rotational movement thereof about a predetermined spin axis angularly oriented with respect to said entrance axis and defining an angle $\theta$ therewith, such location of good imagery at substantially the center thereof being offset from said spin axis by a distance S where $$S = f \sin \theta$$

with $f$ being the focal length of said image-forming system.

9. A panoramic camera, comprising an image-forming system having a location at which good imagery is provided for image recordation thereat and including primary image-forming means and image-offset means, said primary image-forming means having an entrance axis of predetermined direction, support structure providing a mounting for said image-forming system for rotational movement thereof about a predetermined spin axis angularly oriented with respect to said entrance axis and defining an angle $\theta$ therewith, such location of good imagery at substantially the center thereof being offset from said spin axis by a distance S where $$S = f \sin \theta$$

with $f$ being the focal length of said image-forming system, and recording means adjacent one position traversed by such location of good imagery during rotation of said image-forming system so as to be traversed by such location of good imagery upon rotational movement of said image-forming system.

10. A panoramic camera, comprising an image-forming system having a location at which good imagery is provided for photographic recordation and including primary image-forming means and image-offset means, said primary image-forming means having an entrance axis a predetermined direction, support structure providing a mounting for said image-forming system for rotational movement thereof about a predetermined spin axis angularly oriented with respect to said entrance axis and defining an angle $\theta$ therewith, such location of good imagery at substantially the center thereof being offset from said spin axis by a distance S where $$S = f \sin \theta$$

with $f$ being the focal length of said image-forming system, a film platen adjacent one position traversed by such location of good imagery during rotation of said image-forming system about said spin axis, and structure for supporting and advancing film along said platen in facing relation with such location of good imagery so as to be traversed thereby upon rotational movement of said image-forming system.

11. The panoramic camera of claim 10 in which said image-forming system further includes image-correction means providing rectification for any image appearing at such location of good imagery.

12. The panoramic camera of claim 10 in which said spin axis extends substantially through the center of gravity of said image-forming system.

13. The panoramic camera of claim 10 in which said primary image-forming means is a refractive lens system.

14. The panoramic camera of claim 10 in which said primary image-forming means is a reflective lens system.

15. A panoramic camera, comprising an image-forming system having a location at which good imagery is provided for image recordation thereat and including primary image-forming means and image-offset means, and support structure providing a mounting for said image-forming system for rotational movement thereof about a predetermined spin axis, said image-forming system having an exit axis extending through such location of good imagery and being angularly disposed with respect to said spin axis so as to substantially intersect the same at a position approximating the rear nodal point of said image-forming system, said primary image-forming means having an entrance axis of predetermined direction angularly orientated with respect to said spin axis and defining an angle $\theta$ therewith, such location of good imagery at substantially the center thereof being offset from said spin axis by a distance S where $$S = f \sin \theta$$

with $f$ being the focal length of said image-forming system and such offset being in a direction in which the sweep motion of such location of good imagery is opposite to and tends to compensate for the image motion resulting from the rotation of said entrance axis.

16. The panoramic camera of claim 15 in which said primary image-forming means comprises a refractive lens system.

17. The panoramic camera of claim 15 in which said primary image-forming means comprises a reflective lens system.

18. A panoramic camera, comprising an image-forming system having a location at which good imagery is provided for photographic recordation thereat and including primary image-forming means and image-offset means, support structure providing a mounting for said image-forming system for rotational movement thereof about a predetermined spin axis, said image-forming system having an exit axis extending through such location of good imagery and being angularly disposed with respect to said spin axis so as to substantially intersect the same at a position approximating the rear nodal point of said image-forming system, said primary image-forming means having an entrance axis of predetermined direction angularly oriented with respect to said spin axis and defining an angle $\theta$ therewith, such location of good imagery at substantially the center thereof being offset from said spin axis by a distance S where $$S = f \sin \theta$$

with $f$ being the focal length of said image-forming system and such offset being in a direction in which the sweep motion of such location of good imagery is opposite to and tends to compensate for the image motion resulting from the rotation of said entrance axis, a pair of diametrically spaced film platens adjacent the path defined by such location of good imagery upon rotational movement of said image-forming system about said spin axis, and structure for supporting and advancing film along the respective platens in facing relation with such location of good imagery so as to be traversed thereby upon rotational movement of said image-forming system.

19. The panoramic camera of claim 18 in which said structure for supporting and advancing film comprises two units respectively associated with said platens for advancing separate films therealong.

20. In a method of angularly scanning a target area with an image-forming system moving linearly relative thereto from a remote location to provide images of such target area for recordation, the steps of continuously rotating said image-forming system in one angular direction about a predetermined spin axis to effect such angular scanning of a target area, relating such spin axis to the exit axis of said image-forming system so that such two axes substantially intersect at the rear nodal point of said image-forming system, enforcing a fixed orientation upon said image-forming system during such rotation thereof to continuously maintain the aforesaid relation of said axes, whereby the path traced along such target area by the composite angular and linear motions of said image-forming system comprise a plurality of successive annuli the mean diameter of each being defined by the trace of the entrance axis of said image-forming system, synchronously describing with each such scan annulus an image-path annulus the mean diameter of which is defined by the trace of said exit axis, and recording during at least a segment of each forward and aft traversal of such target area defining a single scan annulus the images of such target area respectively corresponding thereto.

21. A panoramic camera, comprising an image-forming system having a location at which good imagery is provided for image recordation thereat, said image-forming system having an entrance axis of predetermined direction, and support structure providing a mounting for said image-forming system for rotational movement thereof about a predetermined spin axis angularly oriented with respect to said entrance axis and defining an angle $\theta$ therewith, such location of good imagery at substantially the center thereof being offset from said spin axis by a distance S where $$S = f \sin \theta$$

with $f$ being the focal length of said image-forming system.

22. A panoramic camera, comprising an image-forming system having a location at which good imagery is provided for image recordation thereat, said image-forming system having an entrance axis of predetermined direction and an exit axis extending through such location of good imagery, and support structure providing a mounting for such image-forming system for rotational movement thereof about a predetermined spin axis angularly oriented with respect to said entrance axis and defining an angle $\theta$ therewith, said exit axis being angularly disposed with respect to said spin axis so as to substantially intersect the same at a position approximating the rear nodal point of said image-forming system, such location of good imagery at substantially the center thereof being offset from said spin axis by a distance S where $$S = f \sin \theta$$

with $f$ being the focal length of said image-forming system.

23. The panoramic camera of claim 22 in which said image-forming system includes both primary image-forming means and image-offset means.

24. A panoramic camera comprising an image-forming system having a location at which good imagery is provided for image recordation thereat, said image-forming system having an exit axis extending through such location of good imagery and an entrance axis of predetermined direction, and support structure providing a mounting for said image-forming system for rotational movement thereof about a predetermined spin axis, said exit axis and said spin axis being angularly disposed with respect to each other and oriented so as to substantially intersect at a position approximating the rear nodal point of said image-forming system, and said entrance axis and said spin axis also being angularly disposed with respect to each other and oriented so as to substantially intersect therealong.

25. The panoramic camera of claim 24 in which said exit axis and said entrance axis are substantially coincident with the result that the intersections of said exit axis and said entrance axis with said spin axis are substantially coincident.

26. In a method of angularly scanning a target area with an image-forming system from a remote location to provide an image of such target area for recordation, said image-forming system including both an entrance aperture having an entrance axis passing therethrough and an exit aperture having an exit axis passing therethrough and further including a location in the vicinity of said exit aperture at which good imagery is provided, the steps of rotating said image-forming system in one angular direction about a predetermined spin axis to effect such angular scanning of a target area, relating such spin axis and said entrance axis so that they substantially intersect to form an angle $\theta$ therebetween and also relating such spin axis and said exit axis so that they substantially intersect at the rear nodal point of said image-forming system, enforcing a fixed orientation upon said image-forming system during such rotation thereof to continuously maintain the aforesaid relation of all of said axes, whereby the path traced along such target area by the entrance aperture of said image-forming system is an annulus the mean diameter of which is defined by the trace of said entrance axis and synchronously described with each such scanning annulus is an image-path annulus the mean diameter of which is defined by the trace of said exit axis, off-setting the center of said location of good imagery from said spin axis by a distance S where $$S = f \sin \theta$$

with $f$ being the focal length of said image-forming system, and $\theta$ being the aforesaid angle between said spin axis and said entrance axis, and recording an image along the path of movement of said exit aperture and such location of good imagery associated therewith.

27. The method of scanning a target area and recording panoramic images thereof which comprises providing an image-forming system including an entrance aperture having an entrance axis passing therethrough and an exit aperture having an exit axis passing therethrough and including also a location in the vicinity of said exit aperture at which good imagery is provided, continuously rotating the system about a fixed spin axis angularly oriented with respect to both said entrance axis and said exit axis and intersecting said entrance axis at an angle $\theta$ and also interesecting said exit axis at a position substantially at the rear nodal point of the image-forming system whereby said exit aperture is continuously orbitally moved about said spin axis, off-setting the center of good imagery at said exit aperture from said spin axis by a distance S where $$S = f \sin \theta$$

with $f$ being the focal length of said image-forming system and $\theta$ being the aforesaid angle between said spin axis and said entrance axis, and recording an image along the orbital path of movement of said exit aperture.

References Cited by the Examiner

UNITED STATES PATENTS

| | | | |
|---|---|---|---|
| 1,855,370 | 4/1932 | Trenor | 88—24 |
| 2,794,379 | 6/1957 | McNeil | 95—16 |
| 2,927,517 | 3/1960 | Trachtman | 95—15 |
| 2,972,281 | 2/1961 | Dresser | 95—16 X |
| 3,016,001 | 1/1962 | Sonne | 95—15 |

FOREIGN PATENTS 886,060  1/1962  Great Britain.

JOHN M. HORAN, *Primary Examiner.*

NORTON ANSHER, *Examiner.*